G. D. WILLIS.
EGG-CARRIERS.

No. 187,952. Patented Feb. 27, 1877.

Witnesses:
John Tyler
Jno. J. Bonner

G. D. Willis   Inventor.
By Attorney
Jno. C. W. Intine

N. PETERS, PHOTO-LITHOGRAPHER, WASHINGTON, D. C.

UNITED STATES PATENT OFFICE.

GEORGE D. WILLIS, OF CAVERNA, KENTUCKY.

IMPROVEMENT IN EGG-CARRIERS.

Specification forming part of Letters Patent No. 187,952, dated February 27, 1877; application filed December 16, 1876.

*To all whom it may concern:*

Be it known that I, GEORGE D. WILLIS, of Caverna, in the county of Hart and State of Kentucky, have invented certain new and useful Improvements in Egg-Carriers; and I do hereby declare that the following is a full and exact description thereof, reference being had to the accompanying drawing, making a part of this application.

My invention relates to novel improvements in egg-carriers. It has for its object to do away with the shelves usually interposed between series of egg-trays, and which serve to keep the eggs supported in the succeeding series of trays from coming in contact with each other. With this object in view, my invention consists of a suitable box, provided with a series of egg-trays, composed of cylindrical paper boxes or tubes, joined together, each alternate series having its outer row of boxes halved vertically, so that the points of juncture shall lie immediately under the points of juncture of the succeeding layer or series of boxes, the spaces between any or every four adjoining boxes lying centrally under the vertical center of the succeeding boxes, thus forming a support for the point of the egg, while the next alternate series forms a support over the butt, as will be hereinafter more fully set forth.

To enable those skilled to more fully understand my invention, I will proceed to describe the same, referring by letters to the accompanying drawing, in which—

Figure 1:
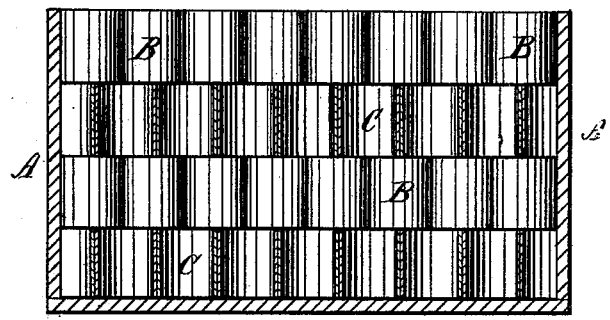
Figure 2:
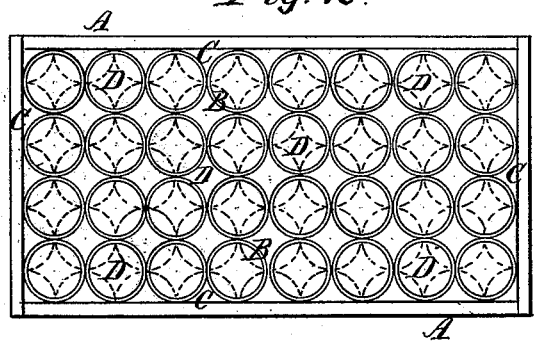

Figure 1 is an elevation of a carrier, embodying the features of my invention, the side of the box being removed to expose the carriers, and Fig. 2 is a top view of the same.

Similar letters indicate like parts in both figures.

A represents the outer case or packing-box, which may be of any desirable shape. B B represent a series of paper tubular boxes, joined together at the points of contact and forming egg-trays, each alternate tray having the outer row of tubular boxes cut away centrally, as shown more clearly by dotted lines in Fig. 2, and at *c c*, Fig. 1, each alternate tray having one less number of rows of cells or being bounded by a row of half-cells, to bear against the sides of the packing-box A.

When these trays are placed alternately within the packing-box A, above and below each cell, and in line with the centers thereof, the quadrantal spaces D will lie so that the eggs within the several cells or boxes have their points and butts covered and protected within the quadrantal spaces D of the preceding and succeeding trays, and the vertical heft of the eggs can in nowise fall upon the rows below, while at the same time perfect ventilation within the packing-box and between the trays is permitted.

What I claim as new, and desire to secure by Letters Patent, is—

In combination with a suitable packing box or case, a series of egg-trays, formed of vertical tubular boxes, glued together, each alternate tray having the outer row cut away vertically, and the several trays being arranged so that the open quadrantal spaces between the tubes shall be presented in line with the centers of the cells of the two adjoining trays, to form a support and cover for the points and butts of the contained eggs, substantially as and for the purposes hereinbefore set forth.

Witness my hand and seal this 4th day of December, 1876.

GEO. D. WILLIS. [L. S.]

Witnesses:
 JOEL WHITE,
 ROBERT H. FLEMING.